(12) United States Patent
White et al.

(10) Patent No.: US 7,435,042 B2
(45) Date of Patent: Oct. 14, 2008

(54) FLEXIBLE AND EXTENDABLE DRILL BIT ASSEMBLY

(76) Inventors: Christopher L. White, 12936 W. Chenango Ave., Morrison, CO (US) 80465; Richard M. Davidian, 6143 Bluebird Hill La., Weddington, NC (US) 28104

( * ) Notice: Subject to any disclaimer, the term of this patent is extended or adjusted under 35 U.S.C. 154(b) by 73 days.

(21) Appl. No.: 11/382,560

(22) Filed: May 10, 2006

(65) Prior Publication Data

US 2007/0264093 A1 Nov. 15, 2007

(51) Int. Cl.
*B23B 31/107* (2006.01)
(52) U.S. Cl. ......................... 408/127; 279/75
(58) Field of Classification Search ................. 279/74, 279/75, 82, 904, 905; 408/127, 238, 239 R, 408/240; *B23B 31/107*
See application file for complete search history.

(56) References Cited

U.S. PATENT DOCUMENTS

| | | | | |
|---|---|---|---|---|
| 1,386,161 A * | 8/1921 | Clifford | ........................ | 464/53 |
| 2,357,773 A * | 9/1944 | Sheskier | ..................... | 408/127 |
| 2,472,392 A | 6/1949 | Alexander | | |
| 2,487,203 A * | 11/1949 | Wilber | ........................ | 464/97 |
| 2,496,412 A * | 2/1950 | Scheppe | ..................... | 464/97 |
| 2,567,994 A * | 9/1951 | Downs | ........................ | 408/127 |
| 2,747,384 A * | 5/1956 | Beam | ........................... | 464/52 |
| 2,926,020 A | 2/1960 | Dayton et al. | | |
| 2,958,349 A * | 11/1960 | McNutt | ........................ | 408/67 |
| 3,006,223 A * | 10/1961 | Broussard | ..................... | 408/85 |
| 3,016,073 A * | 1/1962 | Broussard et al. | ............. | 408/85 |
| 3,251,605 A * | 5/1966 | Ondeck | ........................ | 279/82 |
| 3,735,993 A * | 5/1973 | Seibert | ........................ | 279/75 |
| 4,692,073 A | 9/1987 | Martindell | | |
| 4,900,202 A | 2/1990 | Wienhold | | |
| 4,990,038 A * | 2/1991 | DeLong | ........................ | 408/127 |
| 5,167,476 A * | 12/1992 | Lafferty et al. | ............. | 408/240 |
| 5,398,946 A * | 3/1995 | Quiring | ........................ | 279/30 |
| 5,957,634 A * | 9/1999 | Carpinetti | ..................... | 408/226 |
| 6,199,872 B1 * | 3/2001 | Hasan | ........................... | 279/30 |
| 6,270,087 B1 * | 8/2001 | Mickel et al. | ................. | 279/75 |
| 6,311,989 B1 * | 11/2001 | Rosanwo | ...................... | 279/75 |
| 6,511,266 B1 * | 1/2003 | Groot | .......................... | 408/1 R |
| 6,561,523 B1 | 5/2003 | Wienhold | | |
| 2001/0042964 A1 * | 11/2001 | Bedi et al. | ..................... | 279/30 |

FOREIGN PATENT DOCUMENTS

JP 08090313 A * 4/1996

OTHER PUBLICATIONS

Greenlee, D'versibits & Accessories, [catalog], 3 pgs. (pp. 45-47), date unknown.

* cited by examiner

*Primary Examiner*—Daniel W Howell
(74) *Attorney, Agent, or Firm*—Trego, Hines & Ladenheim, PLLC

(57) ABSTRACT

A flexible, extendable extension assembly used to create extended length holes and holes through inaccessible areas in walls and framing. The extension assembly including a flexible rod having first and second ends; and a holding means secured to the first end of the rod for releasably holding a tool bit for rotation with the rod.

8 Claims, 7 Drawing Sheets

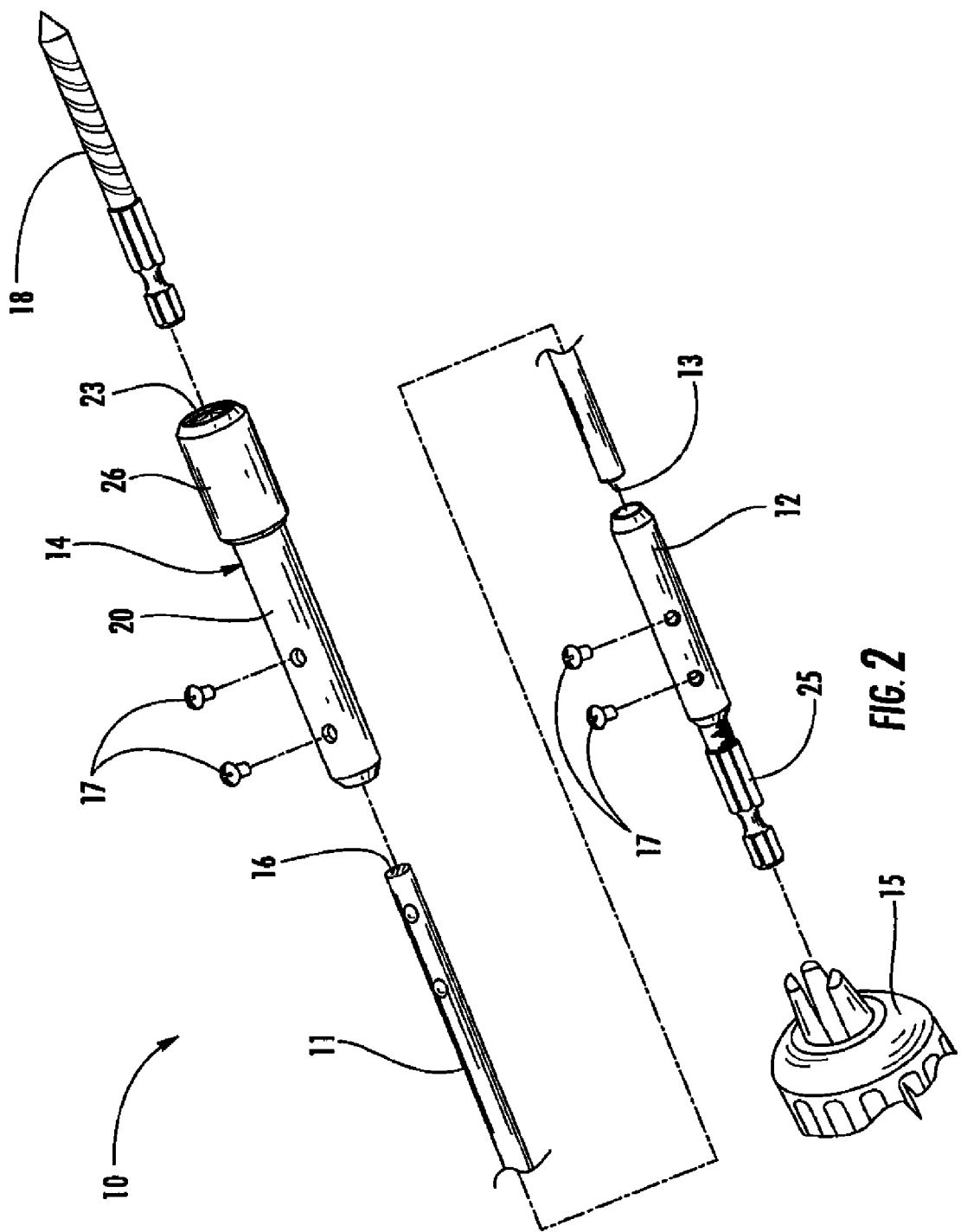

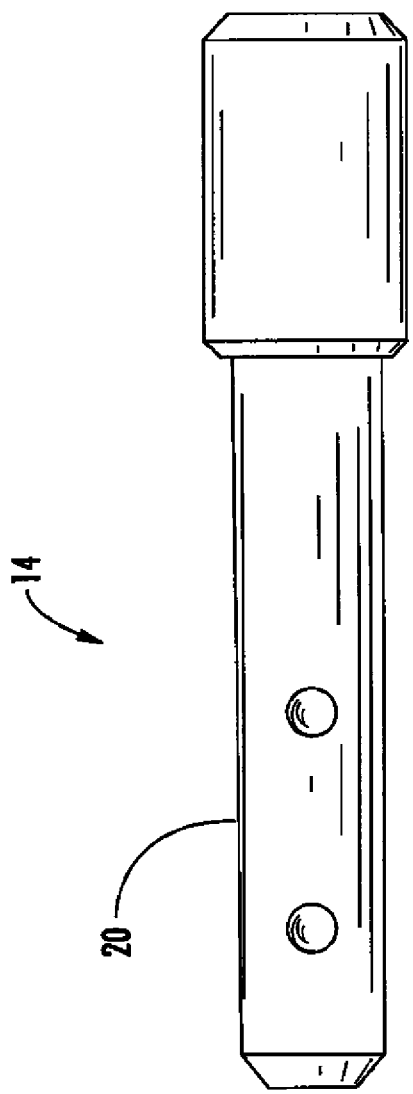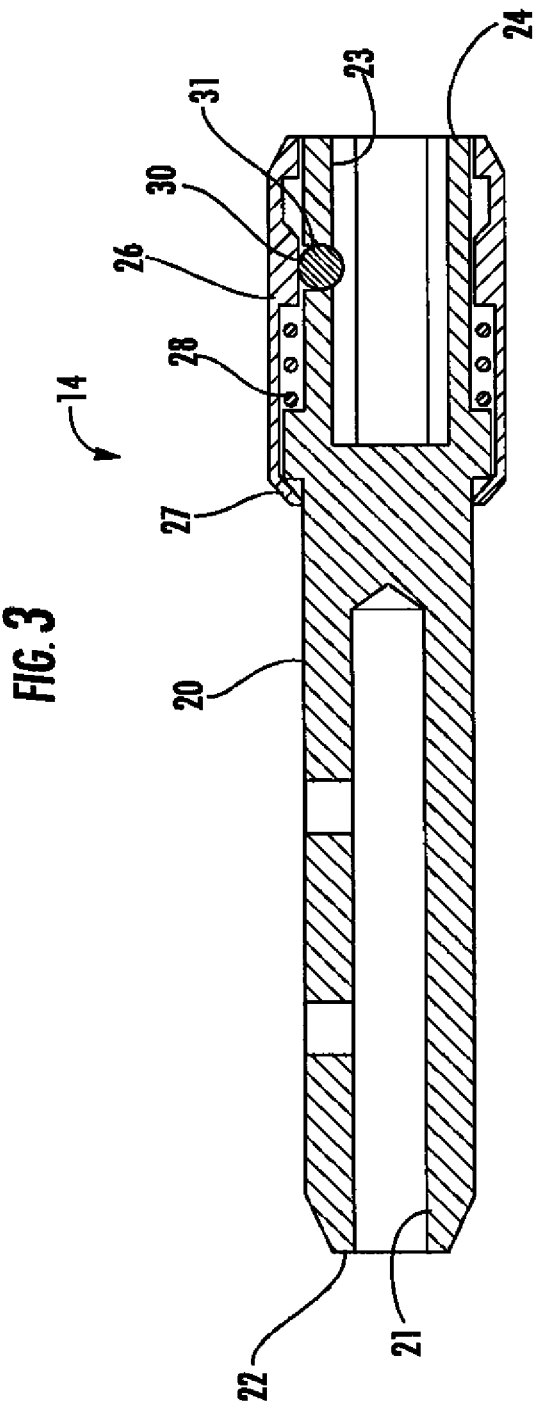

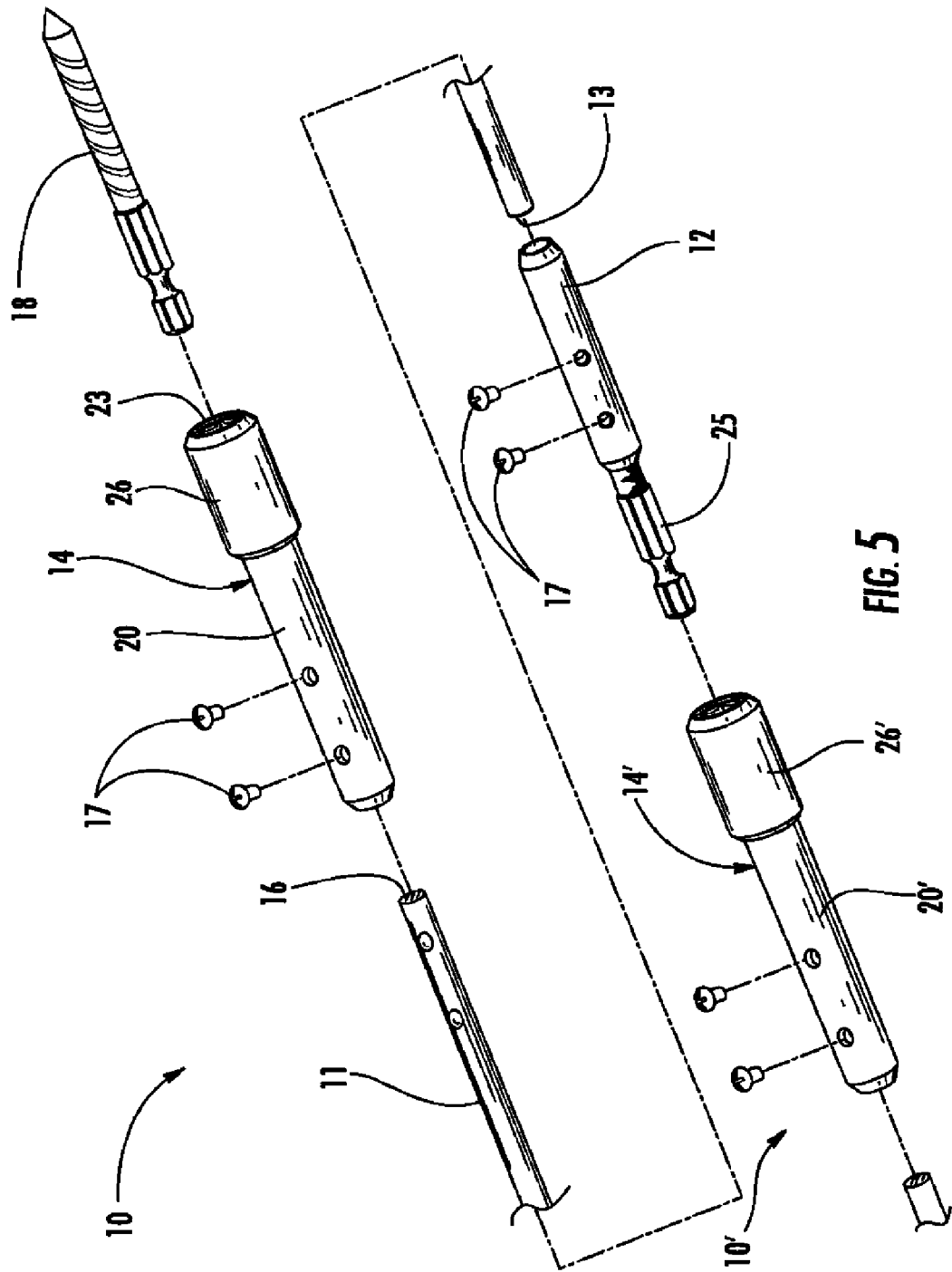

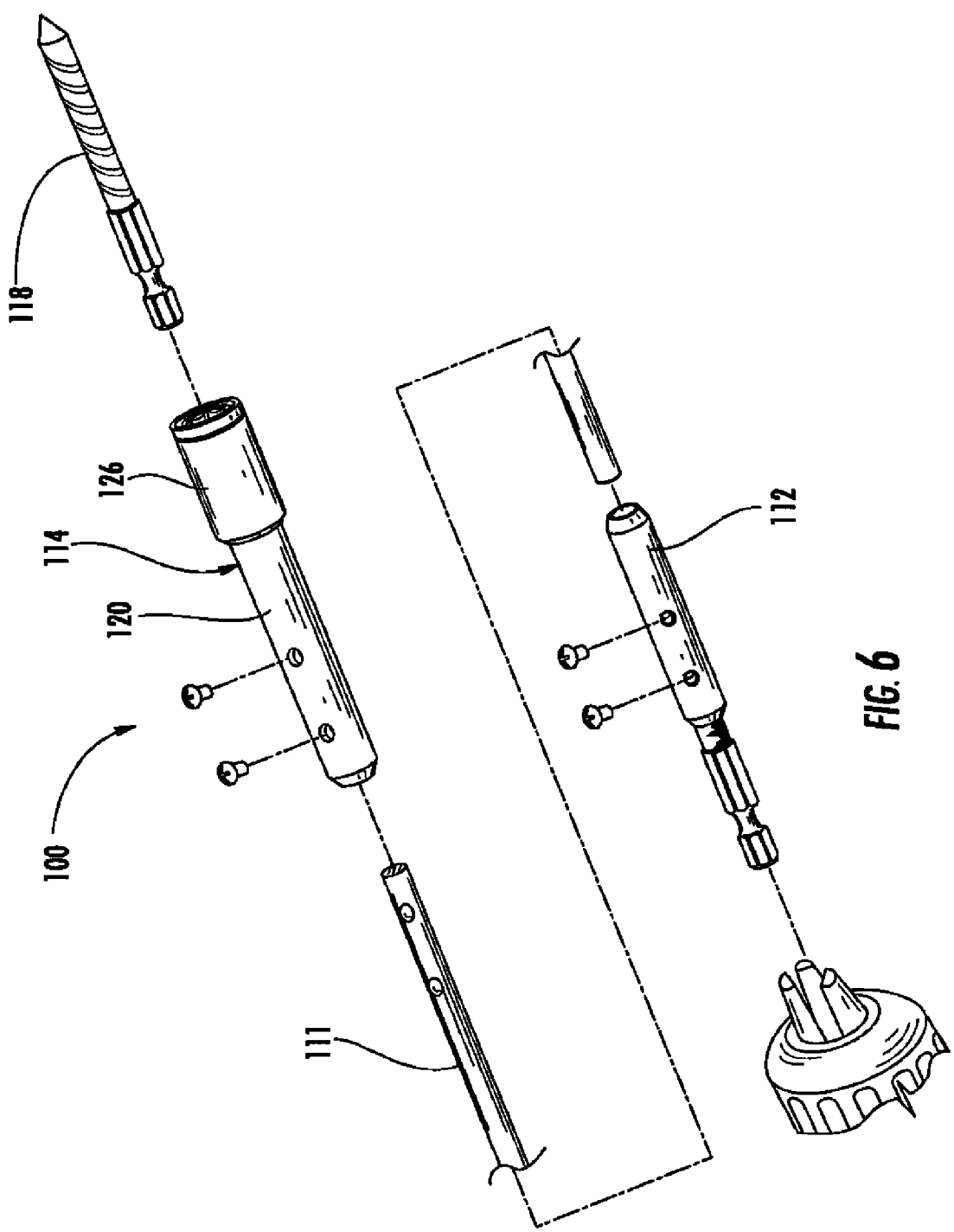

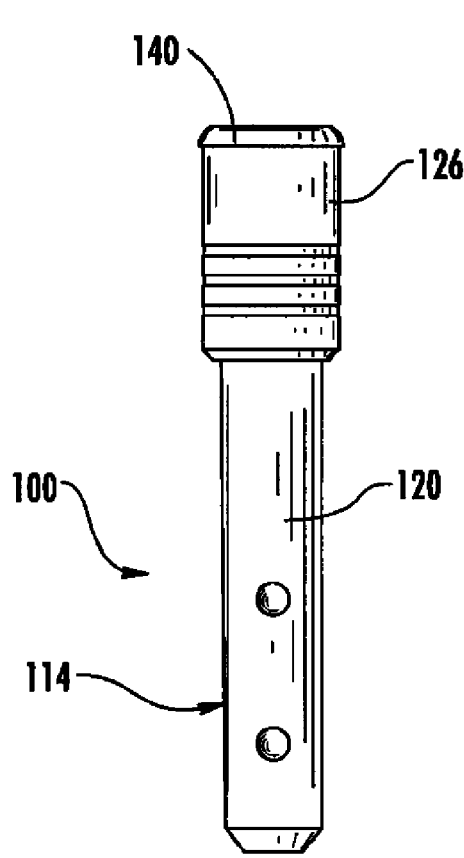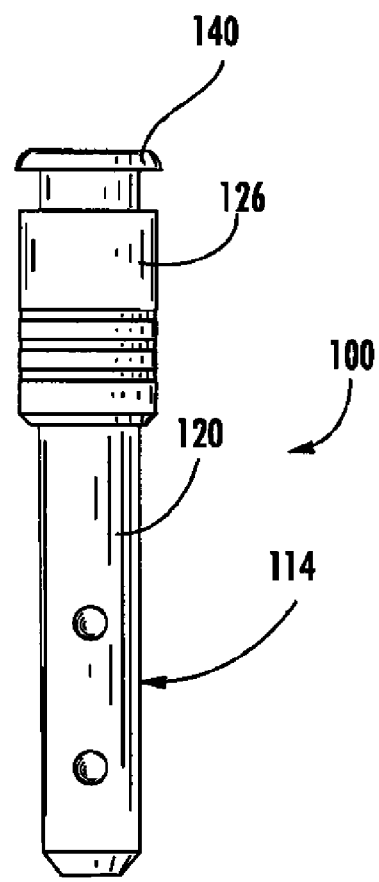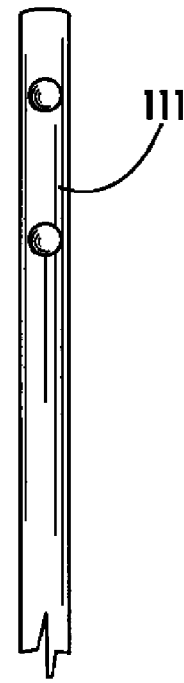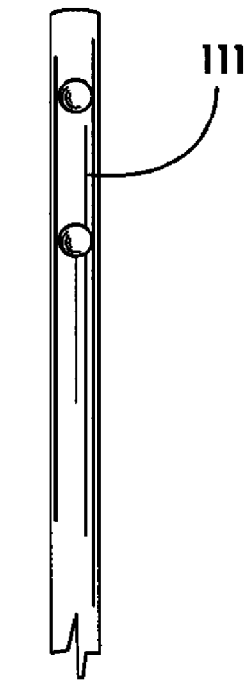
FIG. 9
FIG. 10

FLEXIBLE AND EXTENDABLE DRILL BIT ASSEMBLY

TECHNICAL FIELD AND BACKGROUND OF THE INVENTION

The present invention relates to the field of flexible drill bits used to create extended length holes and holes through inaccessible areas in walls and framing. More particularly, the invention relates to a flexible, extendable drill bit assembly that allows the use of a variety of drilling heads and accessories.

Flexible, extended drill bits are widely employed to create a system of holes within residential and commercial building construction for the purpose of running extended wiring and cabling throughout the building. The extended length drill bits presently available are of a unitary construction, requiring a user to purchase a drill bit having a specified diameter for each individually sized hole desired. The drill bits come in various lengths which require a user to purchase a separate drill bit for each specified length of a hole. Moreover, when the cutting edge is damaged, the entire drill bit must be replaced, incurring additional expense.

Accordingly, there is a need for a flexible, extendable drill bit assembly that allows the use of drill bits and other accessories of various sizes.

SUMMARY OF THE INVENTION

Therefore it is an object of the invention to provide a flexible drill bit assembly that allows a user to change diameters of the drilling bit.

It is another object of the invention to provide a drill bit assembly that allows a user to customize the length of the assembly.

It is another object of the invention to provide a drill bit assembly that includes a flexible extension.

It is another object of the invention to provide a drill bit assembly that includes a quick-release head for receiving various drilling accessories.

It is another object of the invention to provide a drill bit assembly that includes a quick-release head that prevents the drill bit from being inadvertently removed from the head during use.

These and other objects of the present invention are achieved in the preferred embodiments disclosed below by providing an extension assembly. The extension assembly including a flexible rod having first and second ends; and a holding means secured to the first end of the rod for releasably holding a tool bit for rotation with the rod.

According to another preferred embodiment of the invention, and further including a tailpiece secured to a second end of the rod, wherein the tailpiece is adapted to prevent slipping of the extension assembly within a chuck of a drill.

According to another preferred embodiment of the invention, the tailpiece is secured to the rod by at least one set screw.

According to another preferred embodiment of the invention, the holding means is secured to the rod by at least one set screw.

According to another preferred embodiment of the invention, the holding means includes a bore for receiving a tool bit therein and a locking mechanism cooperating with the bore to secure the tool bit therein.

According to another preferred embodiment of the invention, the holding means includes a sleeve operably connected to the locking mechanism and moveable between a release position in which the locking mechanism allows the insertion or removal of a tool bit in the bore and a secure position in which the locking mechanism prevents the insertion or removal of the tool bit in the bore.

According to another preferred embodiment of the invention, the second end of the rod has a hexagonal profile for being received by the chuck of a drill, the second end being adapted to prevent slipping of the extension assembly within the chuck during use.

According to another preferred embodiment of the invention, a drill bit assembly including a flexible rod having first and second ends; a tailpiece secured to the first end of the rod adapted to be received by a chuck of a drill; and a quick-release head secured to the second end of the rod for receiving and securing a drill bit therein.

According to another preferred embodiment of the invention, the tailpiece is secured to the first end by at least one set screw.

According to another preferred embodiment of the invention, the head is secured to the second end of the rod by at least one set screw.

According to another preferred embodiment of the invention, the tailpiece includes a shank having a hexagonal profile for being received by the chuck, the shank being adapted to prevent slipping of the drill bit assembly within the chuck during use.

According to another preferred embodiment of the invention, the quick-release head includes a sleeve moveable between a release position where the drill bit may be removed and a secure position where the drill bit is secured in the head.

According to another preferred embodiment of the invention, a quick-release head including a body having a first bore and a second polygonal bore with an open end for receiving a tool bit having a mating shank; a locking mechanism cooperating with the second bore and moveable between an unlocked position in which the locking mechanism allows the insertion or removal of a tool bit in the second bore and a locked position in which the locking mechanism prevents the insertion or removal of the tool bit in the second bore; and a moveable sleeve positioned around the body adjacent to the second bore and operably connected to the locking mechanism to permit movement of the locking mechanism between the locked and unlocked positions.

According to another preferred embodiment of the invention, and further including a biasing means positioned between the body and the sleeve to bias the sleeve towards the locked position.

According to another preferred embodiment of the invention, and further including an outwardly-extending shield disposed around the open end of the second bore and adapted to prevent unintended contact against an axially-facing surface of the sleeve.

According to another preferred embodiment of the invention, the shield has a diameter greater than the diameter of the sleeve.

According to another preferred embodiment of the invention, the shield is press-fit onto the end of the body.

According to another preferred embodiment of the invention, the sleeve includes a reduced-diameter chamfer disposed in abutting contact with the body to retain the sleeve to the body in an axially direction.

According to another preferred embodiment of the invention, and further including a magnet positioned within the second bore for securing a tool bit therein.

According to another preferred embodiment of the invention, the first bore is adapted to receive an extension rod therein.

BRIEF DESCRIPTION OF THE DRAWINGS

The invention may be best understood by reference to the following description in conjunction with the accompanying drawing figures in which:

FIG. 2 is an exploded view of a drill bit assembly according to an embodiment of the invention;

FIG. 3 is a side view of the quick-release head of the drill bit assembly of FIG. 2;

FIG. 4 is a cross-section of the quick-release head of FIG. 3;

FIG. 5 shows two drill bit assemblies of FIG. 2 connected together;

FIG. 6 is an exploded view of a drill bit assembly according to an alternate embodiment of the invention;

FIG. 9 shows the quick-release head of FIG. 7 in the secure, closed position; and FIG. 10 shows the quick-release head of FIG. 7 in the open, receiving position.

DESCRIPTION OF THE PREFERRED EMBODIMENT AND BEST MODE

Figure 1:
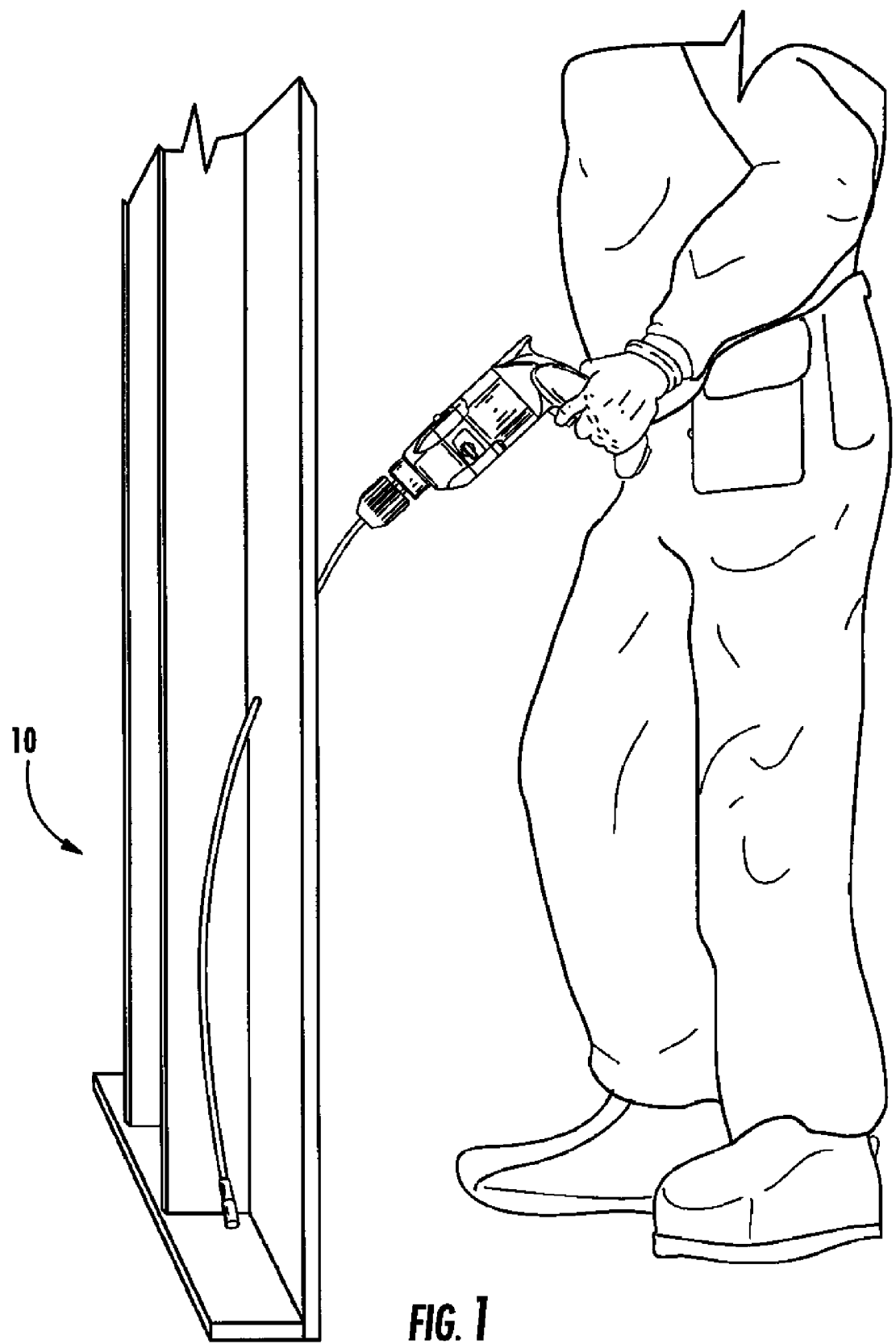
FIG. 1 shows a user drilling an extended length hole through a wall.

Referring now specifically to the drawings, a flexible, extendable drill bit assembly according to an embodiment of the invention is illustrated in FIG. 1 and shown generally at reference numeral 10. As shown, the drill bit assembly 10 allows a user to drill a hole through a wall to allow the user to run wiring and cabling.

As shown in FIG. 2, the drill bit assembly 10 includes a flexible extension rod 11, a tailpiece 12 secured to a first end 13 of the rod 11 and adapted to be received by a drill 15, and a quick-release head 14 secured to an opposing second end 16 of the rod 11. The tailpiece 12 includes a shank 25 with a hexagonal profile to prevent slipping within the drill 15. As illustrated, the first and second ends 13 and 16 are received by the tailpiece 12 and head 14, respectively, and secured by set screws 17. It should be appreciated that the rod 11 may be secured to the tailpiece 12 and head 14 by any suitable fastening means, such as adhesives or welding. Furthermore, the first end of the rod could have a hexagonal shape for being received by a chuck of a drill. A drill bit 18 is received by the head 14 and may be removed and replaced by another drill bit when the cutting edge is damaged.

Referring to FIGS. 3 and 4, the head 14 includes a body 20 having a first bore 21 positioned in a first end 22 for receiving the rod 11 and a second bore 23 positioned in an opposing second end 24 for receiving the drill bit 18. As illustrated, the second bore 23 has a hexagonal profile; however, any suitable profile may be used. A spun-over sleeve 26 is positioned over the second end 24 for releasing and securing the drill bit 18 within the second bore 23. The sleeve 24 includes a chamfered section 27 that abuts against the body 14 to retain the sleeve on the body 14 during use.

A spring 28 is contained between the sleeve 26 and the second end 24 to bias the sleeve 26 towards a securing position. A locking ball 30 is positioned in a recess 31 of the second end 24 for locking the drill bit 18 in the second bore 23. When in the securing position, the sleeve 26 presses the ball 30 inwardly into the second bore 23 to hold the drill bit 18 in position. To release the drill bit 18, the sleeve 26 is pulled back towards the first end 22, thereby compressing the spring 27 and allowing the ball 30 to move outwardly from the bore 23 and into a recess 32 defined by the sleeve 26.

As illustrated in FIG. 5, the drill bit assembly 10 may be connected to another drill bit assembly 10'. As illustrated, the shank 25 of the assembly 10 is inserted into a quick-release head 14' of the drill bit assembly 10'. By connecting multiple drill bit assemblies together, a user can extend the length of the drill bit for longer runs.

Referring to FIG. 6, a drill bit assembly according to another embodiment of the invention is shown generally at reference numeral 100. Like drill bit assembly 10, drill bit assembly 100 includes an extension rod 111, a tailpiece 112, and a quick-release head 114.

Figure 7:
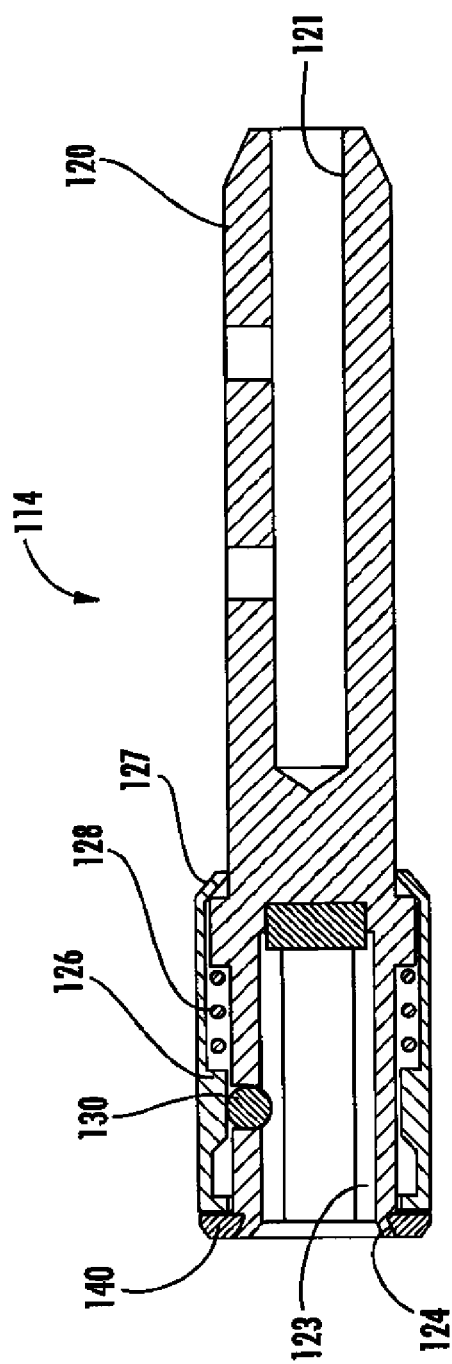
FIG. 7 is a cross-section of a quick-release head of the drill bit assembly of FIG. 6 in a secure, closed position.
Figure 8:
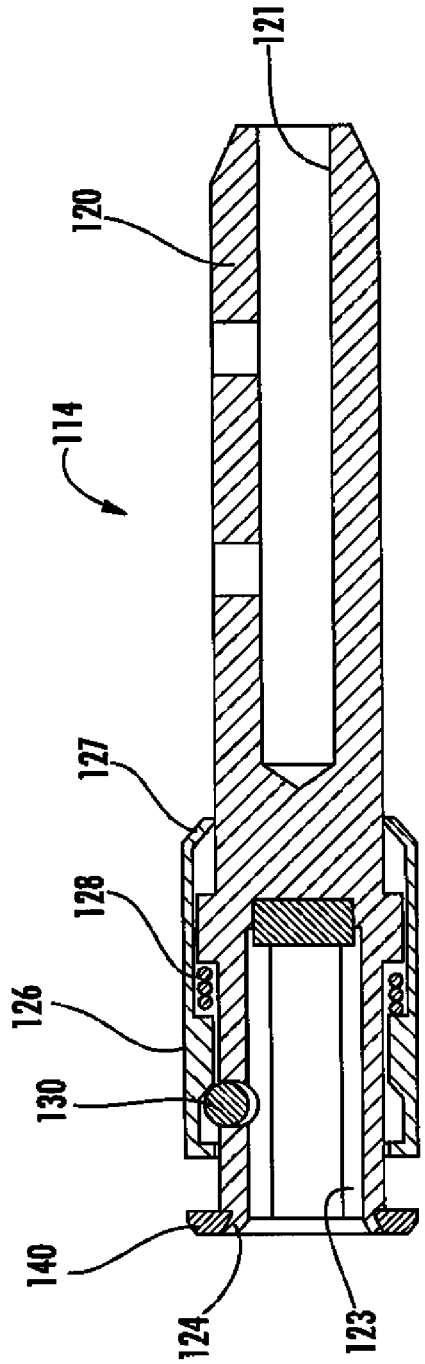
FIG. 8 is a cross-section of the quick-release head of FIG. 7 in an open, receiving position.

As shown in FIGS. 7 and 8, like head 14, head 114 includes a spun-over sleeve 126 having a chamfer and a body 120 having a first bore 121 and a second bore 123. The head 114 also includes a spring 128 and a locking ball 130. Unlike the head 14, head 114 includes a shield 140 and a magnet 141. The shield 140 is attached to a second end 124 of the body 120 independent of the sleeve 126, FIGS. 8 and 10, and is adapted to prevent the sleeve 126 from being inadvertently pushed back towards a first end 122 of the body 120 by a stationary object, which would release a drill bit 118 secured in the second bore 123. As illustrated in FIG. 9, the shield 140 has a diameter slightly larger than a diameter of the sleeve 126. The shield 140 may be integrally formed with the body 120, secured by press-fitting the shield 140 onto the body 120, or any other means for securing the shield 140 to the body 120.

As can be seen in FIGS. 9 and 10, the head 114 operates in substantially the same manner as the head 14.

A flexible and extendible drill bit assembly is described above. Various details of the invention may be changed without departing from its scope. Furthermore, the foregoing description of the preferred embodiments of the invention and best mode for practicing the invention are provided for the purpose of illustration only and not for the purpose of limitation.

We claim:

1. A quick-release head, comprising:
   (a) a body having a first bore and a second polygonal bore with an open end for receiving a tool bit having a mating shank;
   (b) a locking mechanism cooperating with the second bore and moveable between an unlocked position in which the locking mechanism allows the insertion or removal of a tool bit in the second bore and a locked position in which the locking mechanism prevents the insertion or removal of the tool bit in the second bore; and
   (c) a forward biased sleeve positioned around the body adjacent to the second bore having a reduced-diameter chamfer disposed in abutting contact with a shoulder portion of the body to retain the sleeve axially along the body, the chamfer created by deforming an end portion of the sleeve over the shoulder portion of the body, the sleeve being operably connected to the locking mechanism and adapted for movement axially along the body between the forward position where the locking mechanism is moved to the locked position and a rearward position where the locking mechanism is moved to the unlocked position.

2. The quick-release head according to claim 1, and further including a biasing means positioned between the body and the sleeve to bias the sleeve towards the forward position.

3. The quick-release head according to claim 1, and further including an outwardly-extending shield disposed around the open end of the second bore and adapted to prevent unintended contact against an axially-facing surface of the sleeve.

4. The quick-release head according to claim 3, wherein the shield has a diameter greater than the diameter of the sleeve.

5. The quick-release head according to claim 3, wherein the shield is press-fit onto the end of the body.

6. The quick-release head according to claim 1, wherein the chamfer prevents the sleeve from sliding axially along the body past the forward position, thereby retaining the sleeve on the body and preventing a biasing means from pushing the sleeve off of the body.

7. The quick-release head according to claim 1, and further including a magnet positioned within the second bore for securing a tool bit therein.

8. The quick release head according to claim 1, wherein the first bore is adapted to receive an extension rod therein.

\* \* \* \* \*